United States Patent [19]
Green et al.

[11] Patent Number: 5,627,005
[45] Date of Patent: May 6, 1997

[54] KIT FOR SUPPLYING PHOTOPROCESSING CHEMICALS

[75] Inventors: Andrew Green, Middlesex; Paul C. Ward, Herts, both of England

[73] Assignee: Eastman Kodak Company, Rochester, N.Y.

[21] Appl. No.: 527,119

[22] Filed: Sep. 12, 1995

Related U.S. Application Data

[62] Division of Ser. No. 275,220, Jul. 14, 1994, Pat. No. 5,499,488.

[30] Foreign Application Priority Data

Jul. 14, 1993 [GB] United Kingdom ............... 9314621

[51] Int. Cl.$^6$ .............. G03C 5/29; G03C 5/38; G03C 5/26
[52] U.S. Cl. .................. 430/138; 430/458; 430/465; 430/398; 430/399; 430/400; 427/212; 427/213.3
[58] Field of Search ................... 430/138, 458, 430/465, 398, 399, 400; 427/212, 213.3

[56] References Cited

U.S. PATENT DOCUMENTS

| | | | |
|---|---|---|---|
| 3,489,271 | 1/1970 | Tissot | 206/47 |
| 3,981,394 | 9/1976 | Slathar et al. | 53/237 |
| 4,149,887 | 4/1979 | Levy | 430/138 |
| 4,271,965 | 6/1981 | Brambley et al. | 206/219 |
| 4,519,914 | 5/1985 | Etani | 4/538 |
| 4,530,120 | 7/1985 | Etani | 4/538 |
| 4,692,314 | 9/1987 | Etani | 422/265 |
| 4,770,979 | 9/1988 | Koboshi et al. | 430/479 |
| 4,775,485 | 10/1988 | Etani | 210/696 |
| 4,853,131 | 8/1989 | Etani | 210/696 |
| 4,865,884 | 9/1989 | Usami et al. | 53/474 |
| 4,881,356 | 11/1989 | Beezer et al. | 53/240 |
| 4,889,786 | 12/1989 | Takahashi | 430/138 |
| 5,326,757 | 7/1994 | Demopoulos | 514/167 |
| 5,334,492 | 8/1994 | Wernicke et al. | 430/458 |
| 5,383,324 | 1/1995 | Segers et al. | 53/474 |
| 5,385,438 | 1/1995 | Fadaie | 53/474 |
| 5,499,488 | 3/1996 | Green et al. | 53/474 |

FOREIGN PATENT DOCUMENTS

| | | | |
|---|---|---|---|
| 0469877 | 2/1992 | European Pat. Off. | G03C 5/26 |
| 0509807 | 10/1992 | European Pat. Off. | G03C 5/26 |
| 0524414 | 1/1993 | European Pat. Off. | G03C 7/44 |
| 0636929 | 2/1995 | European Pat. Off. | G03C 5/26 |
| 1-294361 | 11/1989 | Japan | H01M 4/22 |
| 2112954 | 12/1982 | United Kingdom | G03C 5/24 |
| 93-13660 | 1/1993 | WIPO | A01N 31/04 |

*Primary Examiner*—Mark F. Huff
*Attorney, Agent, or Firm*—J. Lanny Tucker

[57] ABSTRACT

A plurality of different materials which are required for use in a process and which are to be kept separate up to a predetermined stage in the process are supplied with each different material being encapsulated within a plurality of discrete shells, the shells serving to keep the different materials separate from each other. The shells for the different materials are distinguishable from each other so as to permit subsequent sorting of the shells into batches of shells all containing the same material.

9 Claims, 1 Drawing Sheet

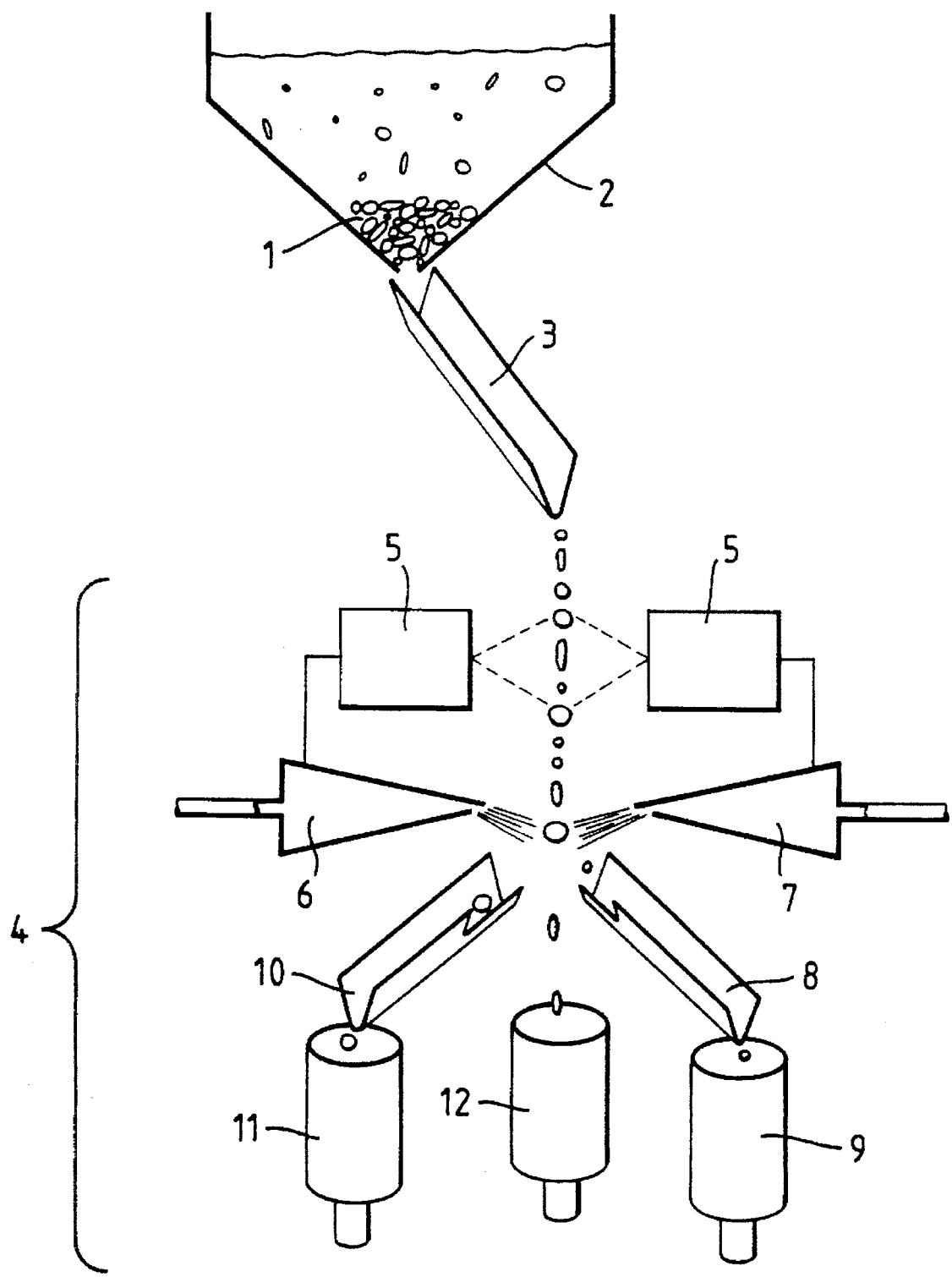

KIT FOR SUPPLYING PHOTOPROCESSING CHEMICALS

This is a Divisional of U.S. application Ser. No. 08/275,220, filed Jul. 14, 1994 now Pat. No. 5,499,488.

BACKGROUND OF THE INVENTION

The Present Invention relates generally to the field of supplying materials and more particularly to the form in which several different materials may be supplied for use in a process and to a method of supplying those materials for use in the process.

By way of example, a unit for the processing of photographic materials must be supplied with a developer material and a fixer material. These materials usually consist of several components which must be mixed together in the correct proportions. These components are often supplied in the form of concentrates which may be in either liquid or powder form. The concentrates must be mixed with water in order to dilute them to the required strength before they are mixed together to produce the developer or fixer material. Thus, whilst providing the component materials as concentrates reduces the required volume of the component, it does necessitate the provision of large quantities of water which is heavy and awkward to handle. It also necessitates the provision of large tanks for storing the water.

The supply of several different components which need to be diluted and mixed together to form a developer material or a fixer material also involves the use of large amounts of packaging. In recent years there has been increasing concern over the protection of the environment and the earth's natural resources which has resulted in the increased recycling of packaging. It is now not uncommon for the suppliers of products to offer to remove and recycle packaging within which their products are supplied, thereby encouraging purchasers who are "environmentally conscious" to invest in their products rather than in a competitors' product where the competitor may not offer to remove and recycle the waste packaging. Clearly in this situation the suppliers are most concerned to keep the amount of packaging which has to be removed and recycled to a minimum.

The components for photographic developers and fixers may be supplied either in the form of liquid concentrates or powder concentrates. Each form has its own advantages and disadvantages. Thus, powders are compact, light and therefore relatively easy to transport, but can create a dusty and hazardous environment when they are removed from their containers. Liquids on the other hand are less hazardous when used but, as mentioned above, are heavy and bulky making them awkward to handle and transport. It has also been proposed to freeze-dry the concentrate components for photographic developers and fixers. Whilst this avoids the problems associated with liquid concentrates and can remove unpleasant smells generated by these types of materials, the freeze-dried product will still produce a dusty and potentially hazardous atmosphere when emptied from its container unless great care is taken during this procedure. A further problem associated with freeze-drying the components for photographic developers and fixers is that the components have to be vacuum-packed in a laminated container or package and a package of this type cannot readily be recycled. Thus, this type of packaging is not particularly "environmentally friendly".

Another factor which has to be born in mind in the supply of photographic developer and fixer materials is that the developer and fixer must be kept separate and thus it is usual to package the individual components for these two materials separately. This gives rise to increased packaging which must be removed and recycled or otherwise disposed of.

Whilst particular reference has been made to the supply of components for photographic developers and fixers, the present invention is not limited to use with such materials and seeks to address the problems outlined above, which also arise in other fields where a variety of different materials must be supplied to a processing unit or are required for use in a process.

SUMMARY OF THE INVENTION

One aspect of this invention provides a kit of materials for use in a process, the kit comprising a plurality of different materials which are to be kept separate up to a predetermined stage in the process, each different material being encapsulated within a plurality of discrete shells which serve to kept the different materials separate from each other, the shells for each different material being distinguishable from each other so as to permit sorting of the shells into batches of shells all containing the same material.

The shells for each different material may be of differing sizes, differing shape and/or differing colour.

Preferably the shells are substantially rigid.

Conveniently the shells are water-soluble. They may be formed from a material comprising sugar.

Advantageously the kit is supplied as a single package comprising the plurality of different materials. In this case it is preferable that the package comprises the different materials in approximately the proportions in which they are required when used in the process.

This invention also provides a kit of photographic processing materials comprising a kit of materials as described above.

Preferably the materials comprise the components of a photographic developer or fixer.

Another aspect of this invention provides a method of supplying a plurality of different materials required for use in a process where the materials are to be kept separate up to a predetermined stage in the process, the method comprising the steps of encapsulating each different material within a plurality of discrete shells which serve to keep the different materials separate from each other, the shells for each different material being distinguishable from each other.

Conveniently the method further comprises the step of packing the plurality of different, encapsulated materials into a single package and supplying the different materials in said single package.

The method may also comprise sorting the different materials from each other and storing them separately. The materials may be sorted by means of an optical sorting apparatus or a mechanical sorting apparatus.

The invention further provides a method of replenishing a stock of a plurality of different materials used in a photographic processing unit, the method comprising supplying the materials to the processing unit in accordance with the method described above.

FIGURE

In order that the present invention may be more readily understood and so that further features thereof may be appreciated, the invention will now be described byway of example, with reference to the accompanying FIGURE which is a schematic illustration of part of a processing unit which is being supplied with materials in accordance with the method of the present invention.

DETAILED DESCRIPTION OF THE INVENTION

In the present invention the materials which are to be supplied to a processing unit or to a process generally are each supplied in the form of a large number of relatively small, hard capsules or shells. The capsules for each different material are distinguishable so that the various different materials required in a particular process may be supplied in a single container or package and may subsequently be sorted by an automated sorting apparatus. The sorting apparatus may comprise an optical or mechanical sorting device or any other appropriate sorting means. It is envisaged that each different material will be encapsulated in a substantially rigid shell which may, for example, be formed of sugar. The shells for the different materials may be distinguishable by being of differing size, shape or colour. The materials within the shells may be in solid, powder or liquid form. Where the materials constitute components which must be mixed in predetermined proportions, a single package may be supplied which contains appropriate proportions of the different materials. The rigidity of the capsules or shells within which the material is contained ensures that the components will not mix together until the shells are broken open, dissolved or until the material is permitted to escape therefrom in some appropriate manner.

The accompanying FIGURE shows part of a photographic processing unit and illustrates the way in which three different materials may be supplied to the processing unit in accordance with this invention.

Each of the three different materials is supplied within shells or capsules 1, there being three different types of capsule corresponding to the three different materials. The three types of capsules may be of differing size, shape or colour. In the example illustrated one type of capsule is a relatively large sphere, whilst a second is a smaller sphere and the third is more elongate in shape. The spherical capsules or shells may typically have a diameter of approximately 1 cm–2 cm, with the other shaped capsules being of comparable size. The three types of capsule could, additionally, be of different colours. The capsules may be water-soluble and could, as mentioned above, be formed from sugar.

The three types of capsules are supplied in a single package, the contents of which are passed into a hopper or funnel 2 having an outlet at its lower end from which the capsules drop onto a chute 3. As the capsules pass along the chute 3 they are gradually separated so that a stream of discrete capsules falls from the lower end of the chute 3. The three different types of capsule containing the three different materials are, of course, randomly arranged in the stream of capsules leaving the chute 3. These capsules may need to be separated and this can be effected using any convenient sorting means.

In the arrangement illustrated the capsules are conveyed to an optical sorting device 4 where they initially move past an optical viewing station 5 where the different types of capsule are identified on the basis of shape, size or colour. The optical viewing station 5 transmits signals to control a source of compressed air connected to nozzles 6 which direct a jet of air onto the stream of capsules in order to deflect certain of the capsules from their flow path.

Thus, two separate nozzles 6, 7 are provided, one on either side of the stream of capsules. The first nozzle 6 is activated upon detection of a first type of capsule by the viewing station 5, this nozzle then deflecting the first type of capsule to one side of the stream so that it falls onto a further chute 8 and is conveyed to a first collecting bin 9. Upon detection of a second type of capsule by the viewing station 5 the second nozzle 7 is activated to provide a jet of air which deflects this second type of capsule to the other side of the normal flow path of the stream of capsules and onto a further chute 10 via which it is conveyed to a second collecting bin 11. Upon detection of the third type of capsule by the viewing station 5 neither of the nozzles 6, 7 are activated and this third type of capsule is allowed to continue along its normal flow path into a third collecting bin 12. It will be appreciated that the accompanying FIGURE is only a schematic illustration and the nozzles 6, 7 are likely to be formed as an integral part of the viewing station or located immediately thereafter in the flow direction of the capsules so that the appropriate type of capsule is deflected by the appropriate nozzle when it is detected in the viewing station.

As an alternative to the optical sorting apparatus illustrated it would be possible to use a mechanical sorting apparatus which may, for example, comprise a series of inclined sieves or mesh-type filters over which the capsules are passed with only certain of the capsules passing through each sieve or mesh and the remainder passing on to the next sieve or mesh until eventually all of the capsules have been separated into batches containing only the same type of capsules (containing only the same material).

After sorting the capsules can then be taken from the collecting bins 9, 11, 12, for subsequent processing.

Where the capsules are formed of sugar and contain the concentrated components used to produce a photographic developer or fixer, they will subsequently be mixed in the correct proportions and diluted with water which will dissolve the sugar capsules thereby permitting the material contained therein to escape. The quantity of sugar used for the capsules would have only beneficial effects on the photographic processes.

If the capsules are formed of a material other than sugar then they may be crushed, punctured or opened in any other appropriate manner to permit the materials to escape therefrom. If necessary the material of the shell may be filtered out prior to its contents being used in a processing unit or process.

Once the materials have been released from the capsules they can be used in the usual way.

It will be appreciated that when supplied in hard capsules or shells the materials for a process are presented in dry form and can be "poured" from a container without creating any significant amount of dust. Several materials may be supplied in a single package or bulk container with the different materials being kept separate due to the rigid nature of the capsules or shells. This makes for easy handling of all the "ingredients" required in a process and minimises the amount of packaging which is required. This also simplifies stock control procedures in connection with processes requiring the supply of several different "ingredients" because the various ingredients can be ordered as a single inventory item. Where a sorting apparatus is provided for separating the various materials as they are supplied to a processing unit, the proportions of the various materials may readily be altered as they are subsequently used in the processing unit. The sorting apparatus will usually be automated and this helps to avoid human error in supplying the materials in the correct proportions.

The sorting apparatus itself can be of a type which is readily available. Thus, for example, an optical sorting apparatus of the type described above and illustrated in the accompanying FIGURE is well known in the food industry where such apparatus is used for the sorting of fungible items such as peas, beans and the like. Alternatively mechanical sorting apparatuses are also well known in many applications and could readily be used in the present invention.

Whilst one particular advantage of this invention is that several different materials which are required in a particular process may be supplied in a single package, it would still be possible to supply a package comprising only a single material where the material is encapsulated within hard shells. This could be of benefit where the particular material in question can be used in several different processes where it is mixed with a variety of other materials. The technology for encapsulating various types of materials within a shell formed of sugar is well known from the sweet making industry and it is therefore envisaged that this particular technology could readily be used in the present invention.

When this invention is used in connection with a photographic processing unit, it makes the replenishment of the materials required within the processing unit a very simple task. All of the "ingredients" required for the developer and fixer which are used within the processing unit can be supplied in a single package which may be emptied directly into the processing unit. Whenever the unit is running low on a stock of any one particular "ingredient" a further supply of the mixed ingredients can be emptied into the machine and this will automatically replenish the supplies of each of the different "ingredients".

Whilst specific reference has been made to a photographic processing unit it is to be understood that this invention may be used in other industries and other processes wherever a variety of components need to be supplied for a particular process. For example, various water treatment processes, such as the treatment of swimming pool water, require the supply of a variety of chemicals.

Whilst reference has been made to distinguishing the various materials by way of the size, shape or colour of the capsules within which the materials are supplied, it would be possible for the capsules to carry markings on their surface by way of which the different materials may be identified. These markings may comprise written text, visual impressions or a three dimensional impression moulded into the surface of the capsule. Although described as hard or rigid in the preferred embodiment, the capsules or shells could be forced from any desired material capable of encapsulating the contents and keeping the different materials separated until the shells are broken open or dissolved. Thus the capsules or shells may be flexible if desired.

The invention has been described in detail with particular reference to preferred embodiments thereof, but it will be understood the variations and modifications can be effected within the spirit and scope of the invention.

What is claimed is:

1. A kit for supplying processing chemicals for use in a photographic process including a plurality of processing stages, the kit comprising a plurality of different photoprocessing chemical components which are to be kept separate from one another before being supplied to the processing stages in the photographic process, said plurality of different photoprocessing chemical components being encapsulated within a plurality of discrete shells which serve to keep said plurality of different photoprocessing chemical components separate from each other, the shells for said plurality of different photoprocessing chemical components being distinguishable from each other so as to permit sorting of the encapsulated photoprocessing chemical components prior to use in said processing stages of said photographic process.

2. The kit of claim 1 wherein the discrete shells for said different photoprocessing chemical components are of differing sizes.

3. The kit of claim 1 wherein the discrete shells for said different photoprocessing chemical components are of differing shape.

4. The kit of claim 1, wherein the discrete shells for said different photoprocessing chemical components are of differing colour.

5. The kit of claim 1 wherein the shells are substantially rigid.

6. The kit of claim 1 wherein the shells are water-soluble.

7. The kit of claim 6 wherein the shells are formed from a material comprising sugar.

8. The kit of claim 1 wherein the photoprocessing chemical components comprise the chemical components of a photographic developer or fixer.

9. A single package for supplying processing chemicals for use in a photographic process including a plurality of processing stages, the package comprising a plurality of different photoprocessing chemical components which are to be kept separate from one another before being supplied to the processing stages in the photographic process, said plurality of different photoprocessing chemical components being encapsulated within a plurality of discrete shells which serve to keep said plurality of different photoprocessing chemical components separate from each other, the shells for said plurality of different photoprocessing chemical components being distinguishable from each other so as to permit sorting of the encapsulated photoprocessing chemical components prior to use in said processing stages of said photographic process.

* * * * *